(12) United States Patent
Yuan et al.

(10) Patent No.: US 11,390,694 B2
(45) Date of Patent: Jul. 19, 2022

(54) GELLAN GUM WITH DOUBLE SETTING TEMPERATURES AND THE PREPARATION METHOD AND USE THEREOF

(71) Applicant: DSM IP ASSETS B.V., Te Heerlen (NL)

(72) Inventors: Chienkuo Yuan, Shanghai (CN); Jie Zhao, Shanghai (CN); Guojun Liu, Shanghai (CN)

(73) Assignee: DSM IP ASSETS B.V., Te Heerlen (NL)

( * ) Notice: Subject to any disclaimer, the term of this patent is extended or adjusted under 35 U.S.C. 154(b) by 23 days.

(21) Appl. No.: 16/495,345

(22) PCT Filed: Mar. 29, 2018

(86) PCT No.: PCT/CN2018/080994
§ 371 (c)(1),
(2) Date: Sep. 18, 2019

(87) PCT Pub. No.: WO2018/177343
PCT Pub. Date: Oct. 4, 2018

(65) Prior Publication Data
US 2020/0017609 A1    Jan. 16, 2020

(30) Foreign Application Priority Data
Mar. 30, 2017    (CN) .......................... 201710204997.6

(51) Int. Cl.
C08B 37/00    (2006.01)
A23L 29/269    (2016.01)

(52) U.S. Cl.
CPC .......... *C08B 37/006* (2013.01); *A23L 29/272* (2016.08); *C08B 37/0003* (2013.01)

(58) Field of Classification Search
CPC .. C08B 37/006; C08B 37/0003; A23L 29/272
See application file for complete search history.

(56) References Cited

U.S. PATENT DOCUMENTS

| | | | |
|---|---|---|---|
| 4,563,366 A | 1/1986 | Baird et al. | |
| 6,242,035 B1 | 6/2001 | Clark et al. | |
| 6,485,771 B1 * | 11/2002 | Somerville | .......... A23C 9/1544 426/519 |
| 7,494,667 B2 | 2/2009 | Chantranukul et al. | |
| 2011/0281307 A1 | 11/2011 | Yang et al. | |

FOREIGN PATENT DOCUMENTS

| | | |
|---|---|---|
| CN | 1663989 A | 9/2005 |
| CN | 101885783 A | 11/2010 |
| CN | 103113488 A | 5/2013 |
| CN | 103145870 A | 6/2013 |
| CN | 103113488 A | 12/2015 |
| JP | 2005073926 A | 3/2005 |
| JP | 2005102616 A | 4/2005 |
| JP | 2005281687 A | 10/2005 |
| JP | 2016199737 A | 12/2016 |

OTHER PUBLICATIONS

Camelin (Biotechnolgy Progress; 1993, 9, 291-297).*
Technical evaluation Report of gellan gum (Compiled by ICF Consulting for the USDA National Organic Program; 2006; pp. 1-6).*
The Second Office Action issued by the China National Intellectual Property Administration (CNIPA) dated Oct. 23, 2020 for the Chinese Patent Application No. 201710204997.6.
The Office Action issued by the China National Intellectual Property Administration (CNIPA) dated Mar. 2, 2020 for the Chinese Patent Application No. 201710204997.6.
The Office Action issued by the Japanese Patent Office dated Aug. 11, 2020 for the Japanese Patent Application No. 2019-552559.
International Search Report and Written Opinion, PCT/CN2018/080994, dated Jul. 6, 2018.
Morrison et al., "Gelatin alternatives for the food industry", In Physical chemistry and industrial application of gellan gum, 114, 127-131, 1999.
Extended European Search Report for European Patent Application No. 18777841.0, dated Dec. 10, 2020.

* cited by examiner

*Primary Examiner* — Pancham Bakshi
(74) *Attorney, Agent, or Firm* — Maschoff Brennan; Brent A. Johnson; Yuefen Zhou

(57) ABSTRACT

A gellan gum product having double setting temperatures, its preparation method and use thereof are provided. The obtained product has low setting temperatures, and the provided preparation method has the advantages of simple pretreatment of fermentation broth, shortened production cycle and direct extraction of such gellan gum product from the fermentation broth

21 Claims, No Drawings

GELLAN GUM WITH DOUBLE SETTING TEMPERATURES AND THE PREPARATION METHOD AND USE THEREOF

CROSS-REFERENCE TO RELATED APPLICATIONS

This application is a National phase of International Application No. PCT/CN2018/080994, filed Mar. 29, 2018, which claims priority to Chinese Patent Application No. 201710204997.6, filed Mar. 30, 2017, both of which are incorporated by reference herein in their entirety.

TECHNOLOGY FIELD

The present invention is related to the field of microbial hydrocolloids preparation. In particular, the present invention is related to a novel gellan gum product with double setting temperatures, its preparation method and use in foodstuff.

BACKGROUND

Microbial hydrocolloids include xanthan gum, gellan gum, etc. Gellan gum is usually in two forms: high acyl (HA) and low acyl (LA). High acyl (HA) gellan gum has single setting temperature which is usually in a high range of 70° C.-90° C., and forms soft and flexible gels. However, the high setting temperature brings difficulties to its application. Low acyl (LA) gellan gum has single setting temperature usually in a low range of 20° C.-50° C., and forms firm and brittle gels. Due to continuously extended application of gellan gum, singe use of either high acyl gellan gum or low acyl gellan gum could not meet the demand of various products. Therefore, it would be desirable to provide a gellan gum product having double setting temperatures within a suitable range, and gel textures between high acyl gellan gum and low acyl gellan gum.

To the best of our knowledge, there has been no report for directly extraction and preparation of gellan gum having double setting temperatures from fermentation broth. In conventional production, gellan gum product having double setting temperatures is prepared by compounding high acyl gellan gum and low acyl gellan gum products. However, the two setting temperatures of obtained compounds still fall in the range of each single component respectively. Generally, the first setting temperature is in the range of 70° C.-90° C., while the second setting temperature is in the range of 20° C.-50° C., therefore, it is still not possible to obtain gellan gum product having two setting temperatures both within the range of 30° C.-50° C. Preparing gellan gum by deacylation on gellan gum fermentation broth has also been disclosed, however, the obtained gellan gum only has single setting temperature and gel texture, which is still not desirable for certain products.

DETAILED DESCRIPTION

The present invention provides a novel gellan gum product, characterized in that the product has double setting temperatures.

In particular, the present invention provides a gellan gum product, which has double setting temperatures: the first setting temperature in the range of 30° C.-40° C., and the second setting temperature in the range of 40° C.-65° C.

The present invention also provides a method for preparing the above gellan gum product, including the following steps:

(1) Pretreatment of gellan gum fermentation broth: adding an alkali metal salt into gellan gum fermentation broth, and stirring to obtain pretreated fermentation broth;
(2) Deacylation of fermentation broth: adjusting pH of the pretreated fermentation broth with an alkali, stirring, adjusting pH back with an acid, and stirring to obtain deacylated fermentation broth;
(3) Removal of metal ions from fermentation broth: adding a metal ion chelating agent into the deacylated fermentation broth, and stirring to obtain fermentation broth with metal ions removed;
(4) pH adjustment back of fermentation broth: adjusting back pH of the fermentation broth with metal ions removed with an acid, and stirring to obtain fermentation broth with pH adjusted back;
(5) Heating of fermentation broth: heating the fermentation broth with pH adjusted back of step (4), and keeping the temperature to obtain hot gel solution; and
(6) Alcohol precipitation, separation, drying and milling of fermentation broth: precipitating by using alcohol the hot gel solution of step (5), separating, drying, and milling to obtain the gellan gum product.

Each step of the above preparation method is described in detail as follows:

(1) Pretreatment of Gellan Gum Fermentation Broth

In this step, an alkali metal salt is added into gellan gum fermentation broth at first. The term "fermentation broth" as used herein refers to culture medium which is inoculated with gellan gum producing strains and fermented to produce gellan gum. The gellan gum producing strains are well known in the art, e.g. *Sphingomonas elodea*. A skilled in the art would understand that in present invention, the fermentation broth includes, but is not limited to, broth directly obtained from fermentation, or broth pretreated according to the state of the art after fermentation.

In this step, the alkali metal salt may be: a divalent metal salt, such as calcium chloride or magnesium chloride; a monovalent metal salt, such as potassium chloride, sodium chloride or lithium chloride. When the alkali metal salt is a divalent metal salt, the added amount is such that the concentration of the metal ions in the fermentation broth reaches 0.001 mol/L-0.1 mol/L, preferably 0.005 mol/L-0.05 mol/L, more preferably 0.008 mol/L-0.02 mol/L based on the volume of the fermentation broth. When the alkali metal salt is a monovalent metal salt, the added amount is such that the concentration of the metal ions in the fermentation broth reaches 0.002 mol/L-0.2 mol/L, preferably 0.005 mol/L-0.1 mol/L, more preferably 0.02 mol/L-0.08 mol/L based on the volume of the fermentation broth. Preferably, the alkali metal salt is potassium chloride or sodium chloride, more preferably potassium chloride.

After adding the alkali metal salt, the fermentation broth is stirred. The stirring may last for 5 minutes to 40 minutes, preferably 10 minutes to 30 minutes, more preferably 10 minutes to 15 minutes. After the stirring, the fermentation broth becomes pretreated fermentation broth which can be used for the next step.

(2) Deacylation of Fermentation Broth

In this step, an alkali is added into the above pretreated fermentation broth to adjust pH at first. The added alkali may be sodium hydroxide, potassium hydroxide, sodium carbonate, and/or calcium hydroxide. Preferably, the alkali is sodium hydroxide, potassium hydroxide, and/or sodium carbonate, more preferably, sodium hydroxide. The alkali may be used to adjust pH of the pretreated fermentation broth to 8.0-13.0, preferably 10.0-13.0, more preferably 11.5-12.5.

After the above pH adjustment by using the alkali, the fermentation broth is stirred. Preferably, the stirring may last for 3 minutes to 30 minutes, more preferably 10 minutes to 20 minutes, even more preferably 15 minutes. Then an acid is used to adjust the pH back. The acid may be hydrochloric acid, nitric acid, citric acid, sulfuric acid, oxalic acid, and/or phosphoric acid, preferably hydrochloric acid, citric acid, and/or sulfuric acid, more preferably citric acid. The acid may be used to adjust pH of the fermentation broth to 3.0-10.0, preferably 4.0-8.0, more preferably 6.0-7.0.

After the above pH adjustment by using the acid, the fermentation broth is stirred, preferably for 3 minutes to 30 minutes, more preferably 10 minutes to 20 minutes, even more preferably 15 minutes, to obtain deacylated fermentation broth which can be used for next step.

(3) Removal of Metal Ions from Fermentation Broth

In this step, a metal ion chelating agent is added into the deacylated fermentation broth at first. The metal ion chelating agent may be sodium citrate, potassium citrate, citric acid, ethylenediaminetetraacetic acid disodium salt, ethylenediaminetetraacetic acid potassium salt, ethylenediaminetetraacetic acid tetrasodium salt, ethylenediaminetetraacetic acid, sodium hexametaphosphate, potassium hexametaphosphate, sodium polyphosphate, potassium polyphosphate, potassium pyrophosphate, sodium pyrophosphate, potassium phosphate monobasic, disodium phosphate, trisodium phosphate, sodium carbonate, sodium bicarbonate, potassium bicarbonate, cation ion exchange resin, ethylene ethylenediamine hydrochloride, diamine diacetate, and/or lithium ethylenediamine. Preferably the metal ion chelating agent is sodium citrate, ethylenediaminetetraacetic acid disodium salt, and/or sodium hexametaphosphate, more preferably sodium citrate and/or ethylenediaminetetraacetic acid disodium salt. The added amount of the metal ion chelating agent may be in the range of from 0.001 wt % to 0.6 wt %, preferably from 0.05 wt % to 0.4 wt %, more preferably from 0.1 wt % to 0.25 wt %, based on the volume of the fermentation broth. After adding the metal ion chelating agent as above, the fermentation broth is stirred, preferably for 3 minutes to 30 minutes, more preferably 10 minutes to 20 minutes, even more preferably 15 minutes to obtain fermentation broth with metal ions removed which can be used for next step.

(4) pH Adjustment Back of Fermentation Broth

In this step, an acid is added into the above fermentation broth with metal ions removed to adjust pH back. The acid may be hydrochloric acid, nitric acid, citric acid, sulfuric acid, oxalic acid, and/or phosphoric acid. Preferably, the acid is hydrochloric acid, citric acid, and/or sulfuric acid, more preferably citric acid. The acid may be used to adjust pH of the fermentation broth to 3.0-8.0, preferably 4.0-7.0, more preferably 4.0-5.0.

After pH adjustment back by using the acid, the fermentation broth is stirred, preferably for 3 minutes to 30 minutes, more preferably 10 minutes to 20 minutes, even more preferably 15 minutes to obtain fermentation broth with pH adjusted back which can be used for next step.

(5) Heating of fermentation broth

In this step, the fermentation broth with pH adjusted back is heated, such as by using plate heat exchanger, to an appropriate temperature. Preferably, the fermentation broth is heated to 80° C.-98° C., more preferably 85° C.-98° C., even more preferably 90° C.-95° C.

After the heating as above, the fermentation broth is kept at the appropriate temperature for 5 minutes to 30 minutes, preferably 10 minutes to 20 minutes, more preferably 12 minutes to 15 minutes, to obtain hot gel solution which can be used for next step. The hot gel solution has increased fluidity compared with the above fermentation broth with pH adjusted back.

(6) Alcohol Precipitation, Separation, Drying, and Milling of Fermentation Broth This step may be carried out according to conventional methods in the art. Particularly, the hot gel solution obtained in the step (5) may be mixed with high concentration alcohol, such as 95% (v/v) alcohol, to precipitate the gellan gum contained therein. The amount of the added alcohol may be 1-5 times, preferably 2-3 times, more preferably 2-2.5 times based on the volume of the hot gel solution. After being completely precipitated, the gellan gum may be separated from the solution according to conventional methods, such as filtration or centrifugation, and then dried and milled to obtain the gellan gum product of the present invention.

The present invention further provides a second method for preparing the gellan gum product of the present invention, including following steps:

(1) Pretreatment of gellan gum fermentation broth: adding an alkali metal salt into gellan gum fermentation broth, stirring, adjusting pH with an alkali, stirring again, and performing solid-liquid separation to obtain solid fiber materials;

(2) Washing solid fiber materials with alcohol: putting the solid fiber materials of step (1) into alcohol, adjusting pH with an acid, stirring, and performing solid-liquid separation to obtain washed solid fiber materials;

(3) Dissolving solid fiber materials: dissolving the washed solid fiber materials of step (2) into hot water, adding a metal ion chelating agent, and heating to obtain hot gel solution;

(4) Adjusting pH back and keeping temperature: adjusting pH of the hot gel solution of step (3) with an acid, stirring and keeping temperature to obtain hot gel solution with pH adjusted back; and (5) Alcohol precipitation, separation, drying, and milling: precipitating the hot gel solution with pH adjusted back of step (4) by using alcohol, separating, drying, and milling to obtain the gellan gum product.

Each step of the above preparation method is described in detail as follows:

(1) Pretreatment of Gellan Gum Fermentation Broth

In this step, an alkali metal salt is added into gellan gum fermentation broth at first. The fermentation broth is the same as above.

In this step, the alkali metal salt may be a divalent metal salt, such as calcium chloride or magnesium chloride. When the alkali metal salt is a divalent metal salt, the added amount is such that the concentration of the metal ions in the fermentation broth reaches 0.01 mol/L-0.2 mol/L, preferably 0.05 mol/L-0.15 mol/L, more preferably 0.08 mol/L-0.1 mol/L based on the volume of the fermentation broth.

After adding the alkali metal salt as above, the fermentation broth is stirred. The "stirring" is the same as above. In this step, the stirring may last for 5 minutes to 40 minutes, preferably 10 minutes to 30 minutes, more preferably 10 minutes to 15 minutes.

In this step, after adding the alkali metal salt and stirring, an alkali may be used to adjust pH of the fermentation broth. The alkali may be sodium hydroxide, potassium hydroxide, sodium carbonate, and/or calcium hydroxide. Preferably, the alkali is sodium hydroxide, potassium hydroxide, and/or sodium carbonate, more preferably sodium hydroxide. The alkali may be used to adjust pH of the fermentation broth to 8.0-13.0, preferably 10.0-13.0, more preferably 11.5-12.5.

After the above pH adjustment by using the alkali, the fermentation broth is stirred again, preferably for 3 minutes to 50 minutes, more preferably 10 minutes to 30 minutes, even more preferably 15 minutes to 25 minutes. Then solid-liquid separation, such as filtration or centrifugation, is carried out to obtain solid fiber materials which can be used for next step.

(2) Washing Solid Fiber Materials with Alcohol

In this step, the above solid fiber materials are putted into alcohol, such as 95% (v/v) alcohol. The amount of the added alcohol may be 1-5 times, preferably 1.5-4 times, more preferably 2-2.5 times based on the volume of the solid fiber materials.

After putting the solid fiber materials into the alcohol as above, an acid may be used to adjust pH of the system. The acid may be hydrochloric acid, nitric acid, citric acid, sulfuric acid, oxalic acid, and/or phosphoric acid. Preferably, the acid is hydrochloric acid, citric acid, and/or sulfuric acid, more preferably citric acid. The acid may be used to adjust pH of the system to 2.0-6.0, preferably 3.0-5.0, more preferably 4.0-4.5.

After pH is adjusted to the appropriate range as above, the mixture is stirred, preferably for 10 minutes to 120 minutes, more preferably 20 minutes to 60 minutes, even more preferably 30 minutes to 50 minutes. Then solid-liquid separation, such as filtration or centrifugation, is carried out to obtain washed solid fiber materials which can be used for next step.

(3) Dissolving Solid Fiber Materials

In this step, the washed solid fiber materials is put into hot water, stirred, and dissolved at first. The hot water refers to water at 80° C.-100° C., preferably 85° C.-98° C., more preferably 90-95° C. The washed solid fiber materials may be added in an amount of 30-80 g, preferably 40-70 g, more preferably 58-65 g per liter of hot water.

After dissolving in hot water as above, a metal ion chelating agent is added to the dissolved solid fiber materials. The metal ion chelating agent may be sodium citrate, potassium citrate, citric acid, ethylenediaminetetraacetic acid disodium salt, ethylenediaminetetraacetic acid potassium salt, ethylenediaminetetraacetic acid tetrasodium salt, ethylenediaminetetraacetic acid, sodium hexametaphosphate, potassium hexametaphosphate, sodium polyphosphate, potassium polyphosphate, potassium pyrophosphate, sodium pyrophosphate, potassium phosphate monobasic, disodium phosphate, trisodium phosphate, sodium carbonate, sodium bicarbonate, potassium bicarbonate, cation ion exchange resin, ethylene ethylenediamine hydrochloride, diamine diacetate, and/or lithium ethylenediamine, preferably sodium citrate, ethylenediaminetetraacetic acid disodium salt, and/or sodium hexametaphosphate, more preferably sodium citrate and/or ethylenediaminetetraacetic acid disodium salt. The added amount of the metal ion chelating agent may be 1.0 wt %-6.0 wt %, preferably 2.0 wt %-5.0 wt %, more preferably 3.0 wt %-4.0 wt % based on the weight of the washed solid fiber materials.

After adding the metal ion chelating agent as above, the system may be heated to 85° C.-98° C., preferably 88° C.-96° C., more preferably 90° C.-95° C. to obtain hot gel solution which can be used for next step.

(4) Adjusting pH Back and Keeping Temperature

In this step, an acid is added to the hot gel solution to adjust pH back. The acid may be hydrochloric acid, nitric acid, citric acid, sulfuric acid, and/or oxalic acid, preferably hydrochloric acid, citric acid, and/or sulfuric acid, more preferably citric acid. The acid may be used to adjust pH of the hot gel solution to 3.0-8.0, preferably 4.0-7.0, more preferably 4.0-4.5.

After pH adjustment by using the acid as above, the hot gel solution is stirred and kept temperature. Preferably, the hot gel solution is kept at the temperature after heating in step (3) for 3 minutes to 30 minutes, more preferably 10 minutes to 20 minutes, even more preferably 12 minutes to 15 minutes, to obtain hot gel solution with pH adjusted back which can be used for next step.

(5) Alcohol Precipitation, Separation, Drying, and Milling

This step may be carried out according to conventional methods in the art. Particularly, the hot gel solution with pH adjusted back obtained in step (4) may be mixed with high concentration alcohol, such as 95% (v/v) alcohol, to precipitate the gellan gum contained therein. The amount of the added alcohol may be 1-5 times, preferably 2-4 times, more preferably 2-2.5 times based on the volume of the hot gel solution. After being completely precipitated, the gellan gum may be separated from the solution according to conventional methods, such as filtration or centrifugation, and then dried and milled to obtain the gellan gum product of the present invention.

The gellan gum product produced by the methods of the present invention has double setting temperatures which are relatively low, and the formed gels have good properties and texture, which are desirable for wide range of applications in foodstuff. Accordingly, the present invention further provides use of the gellan gum product in foodstuff. The foodstuff includes, but is not limited to, desserts, dysphagia foods, dairy products, and/or meat products. The desserts include, but are not limited to, baking jams, toppings, yokan, candies, gummi candies, jellies, fruit cakes, chocolate paste, nut butter, mousses, and/or puddings. The dairy products include, but are not limited to yogurt.

EXAMPLES

The present invention is further illustrated by the following examples. These examples are illustrative for the purpose of explaining the present invention, rather than limiting the scope of the present invention in any way.

Example 1

(1) Pretreatment of Gellan Gum Fermentation Broth

Into 3 L gellan gum fermentation broth, 11.2 g of potassium chloride was added so that the concentration of potassium ions reached 0.05 mol/L, and stirred for 12 minutes.

(2) Deacylation of Fermentation Broth

Firstly, sodium hydroxide solution (10 wt %) was added to the fermentation broth obtained in step (1), to adjust pH of the system to 12.5. After stirring for 15 minutes, hydrochloric acid (10 wt %) was further added to the broth so that the pH was adjusted back to 5.5. Stirring continued for additional 15 minutes.

(3) Removal of Metal Ions in Fermentation Broth 4.5 g sodium citrate was added to the fermentation broth obtained in step (2) so that the concentration of sodium citrate in the broth reached 0.15 wt %. Stirring continued for 15 minutes.

(4) pH Adjustment Back of Fermentation Broth

Hydrochloric acid (10 wt %) was added to the fermentation broth obtained in step (3), to adjust back pH to 4.0. Stirring continued for 15 minutes.

(5) Heating of Fermentation Broth

The fermentation broth obtained in step (4) was heated by plate heat exchanger to 95° C. and kept at this temperature for 12 minutes, to obtain hot gel solution.

(6) Alcohol Precipitation, Separation, Drying and Milling

The hot gel solution obtained in step (5) was mixed with 6 L 95% (v/v) alcohol to precipitate the gellan gum contained therein. After being completely precipitated, the gellan gum was separated by filtration, then put into drier for drying, and then milled to obtain 160 g gellan gum. The setting temperatures were measured by TA rheometer according to its operation manual: first setting temperature, 39° C.; and second setting temperature, 51° C.

Example 2

(1) Pretreatment of Fermentation Broth

Firstly, calcium chloride was added into 3 L gellan gum fermentation broth so that calcium ion concentration was 0.09 mol/L, and stirred for 20 minutes. Then, sodium hydroxide solution (10 wt %) was added into the fermentation broth to adjust pH of the system to 12.5. After reacting for 20 minutes, filtration was carried out to perform solid-liquid separation to obtain 200 g solid fiber materials.

(2) Washing Solid Fiber Materials with Alcohol

Firstly, the solid fiber materials obtained in step (1) was put into 2 volumes of 95% (v/v) alcohol. Then hydrochloric acid (10 wt %) was added to adjust pH of the system to 4.0. After reacting for 60 minutes, filtration was carried out to perform solid-liquid separation to obtain 150 g washed solid fiber materials.

(3) Dissolving Solid Fiber Materials

Firstly, 150 g washed solid fiber materials obtained in step (2) were added to 2.6 L hot water at 85° C. and stirred. Next, 6 g sodium citrate was added, then the temperature of the system was increased to 95° C. to obtain hot gel solution.

(4) Adjusting pH Back and Keeping Temperature

Hydrochloric acid (10 wt %) was added to the hot gel solution obtained in step (3) to adjust pH of the system to 4.0. The reaction was carried out while keeping the temperature for 15 minutes to obtain hot gel solution with pH adjusted.

(5) Alcohol Precipitation, Separation, Drying and Milling

The hot gel solution with pH adjusted obtained in step (4) was mixed with 6 L 95% (v/v) alcohol to precipitate the gellan gum contained therein. After being completely precipitated, the gellan gum was separated by filtration, then put into drier for drying, and then milled to obtain 150 g gellan gum. The setting temperatures were measured by TA rheometer according to its operation manual: first setting temperature, 35° C.; and second setting temperature, 45° C.

Example 3

Chocolate Paste

Because of its special gel texture and lower setting temperatures, the gellan gum of the present invention can be used into chocolate paste to provide a full and creamy taste at a lower fat content, so healthy concept can be achieved by decreasing the fat content without impacting the delicate taste. In addition, the product of present invention has lower calcium sensitivity, so the protein content of the chocolate paste can be further increased under neutral pH for better nutrition and smooth taste. The recommended amount of the gellan gum product of the present invention is 0.01%~1%, preferably 0.1%~0.8%, more preferably 0.25%~0.5% in chocolate paste. Below is an example of chocolate paste:

Recipe:

| Ingredients | wt % |
| --- | --- |
| Skim milk powder | 16.56 |
| Sugar (1) | 8.00 |
| Cocoa powder | 1.50 |
| Cocoa mass | 4.00 |
| Sugar (2) | 3.00 |
| Gellan gum product of the present invention | 0.35 |
| Nisin | 0.05 |
| Monoglyceride | 0.40 |
| Butter | 12.00 |
| Sodium citrate | 0.08 |
| Water | To 100 |

Remark: the protein content was 5.3 wt %, and the fat content was 12.2 wt %;

The chocolate paste was prepared as follows:

①. Skim milk powder was hydrated under 50° C. for 30 minutes;

②. Sugar (1), cocoa powder and cocoa mass were pre-blended evenly and added to ① under quickly stirring. After evenly mixing, the mixture was heated to 80° C. under stirring in water bath, and kept temperature for 20 minutes, until the cocoa powder and cocoa mass were fully dissolved;

③. The obtained mixture of ② was filtrated by 80-mesh gauze while it was still hot;

④. Butter was cut into small pieces, and added to the mixture;

⑤. Sugar (2), monoglyceride and the gellan gum product of the present invention were pre-blended evenly, and added to the mixture of ④ under quickly stirring. The temperature of the mixture was maintained at 65° C., while stirring for 15 minutes;

⑥. UHT: 135° C./5 seconds;

⑦. Filling into the cans under 70~80° C.;

⑧. Cooling down and storing.

Example 4

Cocoa Mousse

Due to the good shearing resistance, the gellan gum product of the present invention can be used in mousse product, as substitute of gelatin. The obtained mousse has good gel properties before whipping, and can effectively wrap air within the mousse and form an orderly network structure to support the structure of the mousse after whipping. Meanwhile, due to the higher melting temperature, the gellan gum product of the present invention has anti-melting property when being used in the products of mousse, ice cream, and the like, so as to maintain nice shapes without quickly collapsing even under room temperature. The recommended amount of the gellan gum product of the present invention is 0.01%~1%, preferably 0.1%~0.8%, more preferably 0.3%~0.5% in such uses. Below is an example of cocoa mousse:

Recipe:

| Ingredients | wt % |
| --- | --- |
| Skim milk powder | 16.56 |
| Sugar (1) | 8.00 |
| Cocoa powder | 1.50 |
| Cocoa mass | 4.00 |
| Sugar (2) | 3.00 |

-continued

| Ingredients | wt % |
| --- | --- |
| Gellan gum product of the present invention | 0.45 |
| Triglyceride monostearate (PGE) | 0.20 |
| Monoglyceride | 0.20 |
| Cream | 25.10 |
| Sodium citrate | 0.07 |
| Water | to 100 |

The cocoa mousse was prepared as follows:

①. Skim milk powder was hydrated under 50° C. for 30 minutes;

②. Sugar (1), cocoa powder and cocoa mass were pre-blended evenly and added to ① under quickly stirring. After evenly mixing, the mixture was heated to 80° C. under stirring in water bath, and kept temperature for 20 minutes, until the cocoa powder and cocoa mass were fully dissolved;

③. The obtained mixture of ② was filtrated by 80-mesh gauze while it was still hot;

④. Cream was added to the mixture;

⑤. Sugar (2), monoglyceride, PGE, sodium citrate, and the gellan gum product of the present invention were pre-blended evenly, and added to the mixture under quickly stirring. The temperature of the mixture was maintained at 65° C., while stirring for 15 minutes;

⑥. UHT: 135° C./5 seconds;

⑦. Filling into the cans under 70~80° C.;

⑧. Cooling down quickly to 5° C.;

⑨. Whipping until the density was in the range of 0.55~0.65 g/m³;

⑩. Filling into the cans and storing under 5° C.

The invention claimed is:

1. A gellan gum, wherein the gellan gum has double setting temperatures measured without adjusting concentration of the gellan gum; wherein a first setting temperature is in the range of 30° C. to 40° C., and a second setting temperature is in the range of 40° C. to 65° C.; and wherein the first setting temperature and the second setting temperature are different.

2. A method for preparing the gellan gum according to claim 1, wherein the method comprises the following steps:
  (1) pretreatment of gellan gum fermentation broth: adding an alkali metal salt into gellan gum fermentation broth, and stirring to obtain pretreated fermentation broth;
  (2) deacylation of fermentation broth: adjusting pH of the pretreated fermentation broth with an alkali, stirring, adjusting pH back with an acid, and stirring to obtain deacylated fermentation broth;
  (3) removal of metal ions from fermentation broth: adding a metal ion chelating agent into the deacylated fermentation broth, and stirring to obtain fermentation broth with metal ions removed;
  (4) pH adjustment back of fermentation broth: adjusting back pH of the fermentation broth with metal ions removed with an acid, and stirring to obtain fermentation broth with pH adjusted back;
  (5) heating of fermentation broth: heating the fermentation broth with pH adjusted back of step (4), and keeping the temperature to obtain hot gel solution; and
  (6) alcohol precipitation, separation, drying and milling of fermentation broth: precipitating the hot gel solution of step (5) by using alcohol, separating, drying, and milling to obtain the gellan gum.

3. The method according to claim 2, wherein said alkali metal salt of step (1) is a divalent alkali metal salt, monovalent alkali metal salt, or a combination thereof.

4. The method according to claim 2, wherein said alkali of step (2) comprises one or more alkali selected from the group consisting of sodium hydroxide, potassium hydroxide, sodium carbonate, and calcium hydroxide.

5. The method according to claim 2, wherein said acid of step (2) comprises one or more acid selected from the group consisting of hydrochloric acid, nitric acid, citric acid, sulfuric acid, oxalic acid, and phosphoric acid.

6. The method according to claim 2, wherein said metal ion chelating agent of step (3) comprises one or more metal ion chelating agent selected from the group consisting of sodium citrate, potassium citrate, citric acid, ethylenediaminetetraacetic acid disodium salt, ethylenediaminetetraacetic acid potassium salt, ethylenediaminetetraacetic acid tetrasodium salt, ethylenediaminetetraacetic acid, sodium hexametaphosphate, potassium hexametaphosphate, sodium polyphosphate, potassium polyphosphate, potassium pyrophosphate, sodium pyrophosphate, potassium phosphate monobasic, disodium phosphate, trisodium phosphate, sodium carbonate, sodium bicarbonate, potassium bicarbonate, cation ion exchange resin, ethylene ethylenediamine hydrochloride, diamine diacetate, and lithium ethylenediamine.

7. The method according to claim 2, wherein said acid of step (4) comprises one or more acid selected from the group consisting of hydrochloric acid, nitric acid, citric acid, sulfuric acid, oxalic acid, and phosphoric acid.

8. A method for preparing the gellan gum according to claim 1, wherein the method comprises following steps:
  (1) pretreatment of gellan gum fermentation broth: adding an alkali metal salt to gellan gum fermentation broth, stirring, adjusting pH with an alkali, stirring again, and performing solid-liquid separation to obtain solid fiber materials;
  (2) washing solid fiber materials with alcohol: putting the solid fiber materials of step (1) into alcohol, adjusting pH with an acid, stirring, and performing solid-liquid separation to obtain washed solid fiber materials;
  (3) dissolving solid fiber materials: dissolving the washed solid fiber materials of step (2) into hot water, adding a metal ion chelating agent, and heating to obtain hot gel solution;
  (4) adjusting pH back and keeping temperature: adjusting pH of the hot gel solution of step (3) with an acid, stirring, and keeping temperature to obtain hot gel solution with pH adjusted back; and
  (5) alcohol precipitation, separation, drying, and milling: precipitating the hot gel solution with pH adjusted back of step (4) by using alcohol, separating, drying, and milling to obtain the gellan gum.

9. The method according to claim 8, wherein said alkali metal salt of step (1) is a divalent alkali metal salt.

10. The method according to claim 8, wherein said alkali of step (1) comprises one or more alkali selected from the group consisting of sodium hydroxide, potassium hydroxide, sodium carbonate, and calcium hydroxide.

11. The method according to claim 8, wherein said acid of step (2) comprises one or more acid selected from the group consisting of hydrochloric acid, nitric acid, citric acid, sulfuric acid, oxalic acid, and phosphoric acid.

12. The method according to claim 8, wherein said metal ion chelating agent of step (3) comprises one or more metal ion chelating agent selected from the group consisting of sodium citrate, potassium citrate, citric acid, ethylenediaminetetraacetic acid disodium salt, ethylenediaminetetraacetic acid potassium salt, ethylenediaminetetraacetic acid tetrasodium salt, ethylenediaminetetraacetic acid, sodium hexametaphosphate, potassium hexametaphosphate, sodium polyphosphate, potassium polyphosphate, potassium pyrophosphate, sodium pyrophosphate, potassium phosphate monobasic, disodium phosphate, trisodium phosphate, sodium carbonate, sodium bicarbonate, potassium bicarbonate, cation ion exchange resin, ethylene ethylenediamine hydrochloride, diamine diacetate, and lithium ethylenediamine.

13. The method according to claim 8, wherein said acid of step (4) comprises one or more acid selected from the group consisting of hydrochloric acid, nitric acid, citric acid, sulfuric acid, and oxalic acid.

14. A method for producing a foodstuff comprising the step of mixing the gellan gum according to claim 1, wherein the foodstuff is selected from a group consisting of a desert, a dysphagia food, a dairy product, and a meat product.

15. A gellan gum, wherein the gellan gum has double setting temperatures measured without adjusting concentration of the gellan gum, wherein a first setting temperature and a second setting temperature are both in a range of 30° C. to 50° C., and wherein the first setting temperature and the second setting temperature are different.

16. A composition comprising the gellan gum according to claim 1, wherein the gellan gum is present in a foodstuff.

17. A composition comprising the gellan gum according to claim 15, wherein the gellan gum is present in a foodstuff.

18. The composition of claim 16, wherein the foodstuff is selected from a group consisting of a dessert, a dysphagia food, a dairy product, and a meat product.

19. The composition of claim 17, wherein the foodstuff is selected from a group consisting of a dessert, a dysphagia food, a dairy product, and a meat product.

20. The composition of claim 18, wherein the dessert is a chocolate paste or mousse.

21. The composition of claim 19, wherein the dessert is a chocolate paste or mousse.

* * * * *